United States Patent
Cannefax et al.

(10) Patent No.: US 12,469,235 B2
(45) Date of Patent: *Nov. 11, 2025

(54) METHOD AND SYSTEM FOR MATCHING CONDITIONS FOR DIGITAL OBJECTS IN AUGMENTED REALITY

(71) Applicant: Unity Technologies ApS, Copenhagen (DK)

(72) Inventors: Stella Mamimi Cannefax, Oakland, CA (US); Andrew Peter Maneri, Bellevue, WA (US); Amy Melody DiGiovanni, Oakland, CA (US)

(73) Assignee: Unity Technologies ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,798

(22) Filed: Apr. 18, 2024

(65) Prior Publication Data

US 2024/0346781 A1    Oct. 17, 2024

Related U.S. Application Data

(63) Continuation of application No. 17/336,251, filed on Jun. 1, 2021, now Pat. No. 11,989,837.

(60) Provisional application No. 63/032,419, filed on May 29, 2020.

(51) Int. Cl.
*G06T 19/00* (2011.01)
*G06F 16/901* (2019.01)
*G06T 19/20* (2011.01)
*G06V 20/20* (2022.01)

(52) U.S. Cl.
CPC ........ *G06T 19/006* (2013.01); *G06F 16/9024* (2019.01); *G06T 19/20* (2013.01); *G06V 20/20* (2022.01)

(58) Field of Classification Search
CPC ... G06T 19/006; G06T 19/20; G06F 16/9024; G06V 20/20
See application file for complete search history.

(56) References Cited

U.S. PATENT DOCUMENTS

| 10,803,669 | B1 * | 10/2020 | Roche | G06F 3/04815 |
| 2013/0044128 | A1 * | 2/2013 | Liu | G02B 27/017 |
| | | | | 345/633 |
| 2015/0279101 | A1 * | 10/2015 | Anderson | G09G 5/377 |
| | | | | 345/633 |

(Continued)

*Primary Examiner* — Daniel F Hajnik
*Assistant Examiner* — Jed-Justin Imperial
(74) *Attorney, Agent, or Firm* — Schwegman Lundberg & Woessner, P.A.

(57) ABSTRACT

A method of spawning a digital island in a three-dimensional environment is disclosed. Data describing a three-dimensional environment is accessed. The data is partitioned into a plurality of contexts based on properties identified in the data, the properties corresponding to surfaces or objects in the three-dimensional environment. One or more values of one or more traits corresponding to a context of the plurality of context are identified. A digital island is matched to the context. The matching includes analyzing one or more conditions associated with the digital island with respect to the one or more values of the one or more traits corresponding to the context. Based on the matching, the spawning of the digital island is performed in the three-dimensional environment for the context.

20 Claims, 5 Drawing Sheets

(56) References Cited

U.S. PATENT DOCUMENTS

2020/0342668 A1\* 10/2020 Chojnacka ............. G06V 20/20

\* cited by examiner

METHOD AND SYSTEM FOR MATCHING CONDITIONS FOR DIGITAL OBJECTS IN AUGMENTED REALITY

CROSS-REFERENCE TO RELATED APPLICATIONS

This application is a continuation of and claims the benefit of priority under 35 U.S.C. § 120 to U.S. patent application Ser. No. 17/336,251, filed on Jun. 1, 2021, which claims the benefit of U.S. Provisional Application No. 63/032,419, filed May 29, 2020, entitled "METHOD AND SYSTEM FOR MATCHING CONDITIONS FOR DIGITAL OBJECTS IN AUGMENTED REALITY," each of which is incorporated by reference herein in its entirety.

TECHNICAL FIELD

The subject matter disclosed herein generally relates to the technical field of creating and manipulating digital content for mixed reality environments.

BACKGROUND OF THE INVENTION

When creating and editing digital content within a mixed reality (MR) environment (e.g., for use in MR games and other MR applications), using traditional authoring techniques is problematic due to the dynamic and unpredictable (e.g., unknown during authoring) nature of real-world objects on which virtual objects are placed at runtime. The digital content must be placed, oriented, scaled, and given properties during authoring (e.g., during creation and editing) so that the content appears as desired by the author during runtime (e.g., during game or simulation runtime). Authoring in mixed reality is not the same as authoring in standard 3D environments wherein a virtual environment is known, controlled and stable. In a mixed reality environment, typically information from the real-world is received at runtime via a camera (either regular or depth) and provides incomplete knowledge of a surrounding environment which cannot be known in advance during an authoring process. During the authoring process, many missing details about the runtime environment make it difficult, and sometimes impossible, to efficiently and directly author digital content prior to runtime (e.g., the existence, orientation, placement, dimensions, scale and other properties of objects in a real-world environment cannot all be known in advance). While real-world surfaces are often detectable (e.g., via image analysis) and some level of semantic understanding of device surroundings is achievable, current MR authoring software often only has one or two detected horizontal/vertical planes on which to place virtual objects. More importantly, these surfaces are often provided without any context of what they represent (e.g., floor vs. tabletop). An author of MR content typically has to place virtual objects in the MR environment manually by visually determining an adequate place. This is not an efficient way of authoring in MR environments.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

Throughout the description herein, the term 'authoring' should be understood to include the creation and editing of mixed reality experiences and the digital content therein. Authoring may involve a user directly manipulating digital content as it appears in a mixed reality environment via a mobile device (e.g., head mounted display, mobile phone, tablet, and the like) or via a user interface on a computer screen (e.g., desktop or laptop).

The term 'build' and 'game build' used throughout the description herein should be understood to include a compiled binary code of a game which can be executed on a device, and which, when executed can provide a playable version of the game (e.g., playable by a human or by an artificial intelligence agent).

Throughout the description herein, the term 'mixed reality' (MR) should be understood to include all combined environments in the spectrum between reality and virtual reality (VR) including virtual reality, augmented reality (AR) and augmented virtuality.

Throughout the description herein, the term 'spawning' should be understood to relate to a creation (e.g., instantiation) and placement of a digital object in an environment (e.g., within an AR environment). The placement may be performed according to the method 200 described below and may use criteria referred to herein as 'conditions'. The conditions associated with a digital object specify criteria for at least a location, orientation and size for a spawning and placement of a digital object within the environment. The conditions help define and limit the placement.

In accordance with an embodiment, a condition can include a plurality of spawning criteria for a digital object within an MR environment, wherein the spawning criteria includes one or more of the following: location criteria (e.g., including location of the digital object with respect to other objects in the MR environment, elevation of the digital object above another object, geolocation of the digital object (e.g., with GPS data), and the like), proximity criteria (e.g., including distance criteria between the digital object and one or more additional objects in the MR environment), orientation criteria (e.g., an angle criteria between the digital object and other objects or surfaces), alignment criteria (e.g., including horizontal and vertical alignment of a part of the digital object with one or more objects (or parts of the objects) in the MR environment, alignment between the digital object and other objects), object dimension criteria (e.g., including criteria regarding the digital object size), lighting criteria (e.g., criteria regarding an amount and a type of light hitting the digital object or hitting a spawning location in the MR environment), color criteria (e.g., a criteria regarding an apparent color of the digital object), texture criteria (e.g., a criteria regarding a texture of the digital object) and any other property of the digital object and surrounding MR environment. In accordance with an embodiment, criteria within a condition may be provided as a range of values. In accordance with an embodiment, a set of conditions associated with a digital object specify where and how the digital object can be spawned (e.g., placed) within an MR environment when using the method 200 described below for matching a digital object with a segment (e.g., segment the MR environment, wherein each segment may be referred to herein as a context as described below) within the environment.

In accordance with an embodiment, conditions can include non-spatial criteria that include one or more of the following: lighting (e.g., specifying an amount of incident light hitting an object or a location in an MR environment), and color (e.g., an acceptable color range of an object), and texture (e.g., roughness, reflectivity, transparency, surface flexibility, and the like), and type of object (e.g., chair, table, ball, wall, etc.) and other user-defined criteria.

In accordance with an embodiment, the term 'Digital Island' used throughout the description herein should be understood to include a digital object that occupies a volume of space in which a coordinate system is stable and which can include additional digital objects and which can be placed and manipulated within an MR environment. In accordance with an embodiment, a digital island may be a digital object. A Digital Island may be used to represent a real-world object or a part of a real-world object (e.g., a table, or a flat surface of a table top, a couch, a chair, a light, a bench, and the like). The real-world object or part of a real-world object may be referred to as a 'context' (e.g., an environment segment) in the description below. A Digital Island can also represent a virtual object (e.g., in a virtual reality environment). In accordance with an embodiment, a Digital Island may take a form of an object it is representing. For example, the Digital Island could be a virtual plane when representing a real-world flat surface such as the top of a table. For objects with more complicated surface and volume geometry (e.g., a couch, a chair, a light, etc.), the Digital Island could instead be represented by a 3D model for the object. In accordance with an embodiment, a Digital Island may include one or more conditions which allows it to be placed (e.g., spawned) within a MR environment and allows other objects to be placed on it (e.g., using the method 200 described below).

In accordance with an embodiment, a Digital Island may provide a local coordinate system for digital authoring (e.g., by a user), wherein the digital authoring includes adding (e.g., spawning) digital objects to the Digital Island wherein the digital objects become associated with the Digital Island (e.g., have a parent-child relationship wherein the child shares some properties with the Digital Island parent). The digital authoring can include using the method 200 described below to match digital objects to a Digital Island in a real-world context. In accordance with an embodiment, during operation, the local coordinate system of a digital island is mapped (e.g., using the method 200 described below) to real-world context data (e.g., data describing a segment of a target spawning environment such as the real-world) based on a matching of conditions associated with the Digital Island.

A method of spawning a digital island in a three-dimensional environment is disclosed. Data describing a three-dimensional environment is accessed. The data is partitioned into a plurality of contexts based on properties identified in the data, the properties corresponding to surfaces or objects in the three-dimensional environment. One or more values of one or more traits corresponding to a context of the plurality of context are identified. A digital island is matched to the context. The matching includes analyzing one or more conditions associated with the digital island with respect to the one or more values of the one or more traits corresponding to the context. Based on the matching, the spawning of the digital island is performed in the three-dimensional environment for the context.

An MR context solver system and associated methods are described herein. The MR context solver is a system and associated methods for real-time determination of digital object spawning (e.g., including object selection and placing) in an MR environment based on a context within the environment. The MR context solver method and system allows for creation of digital content in a MR environment without a user directly writing software code and without manual placement of digital objects (e.g., by a user during augmented reality scene creation). The MR context solver system and methods may use predetermined conditions associated with a digital object to automatically spawn and place one or more copies of the digital object in an MR environment according to a matching of details within the conditions to elements (e.g., a context) within the environment, wherein the matching is described in detail with respect to FIG. 2 and FIG. 3.

In accordance with an embodiment, the MR context solver system (as described below with respect to FIG. 1, FIG. 2, FIG. 3, FIG. 4 and FIG. 5) is configured to display and manipulate digital content within an MR environment via a MR-capable device. In an example embodiment, a user (e.g., a wearer of an HMD, or someone holding a smartphone, tablet, or other MR-capable device) experiences the MR environment as presented by the MR context solver system via an MR device. In some embodiments, the MR environment as seen by a user includes a view of the real-world (e.g., including immediate surroundings of the MR-capable device) along with virtual content provided by the MR context solver system. In accordance with some embodiments, the MR device includes a camera configured to capture digital video or images of the real-world around the device (e.g., when held by a user), optionally including depth data, which the MR context solver system may analyze to provide some of the MR context solver features described herein.

In some embodiments, the MR context solver system and the various associated hardware and software components described herein may provide virtual reality (VR) content instead of, or in addition to, augmented reality (AR) content. It should be understood that the systems and methods described herein may be performed with AR content and VR content and, as such, the scope of this disclosure covers both AR and VR applications.

Figure 1:
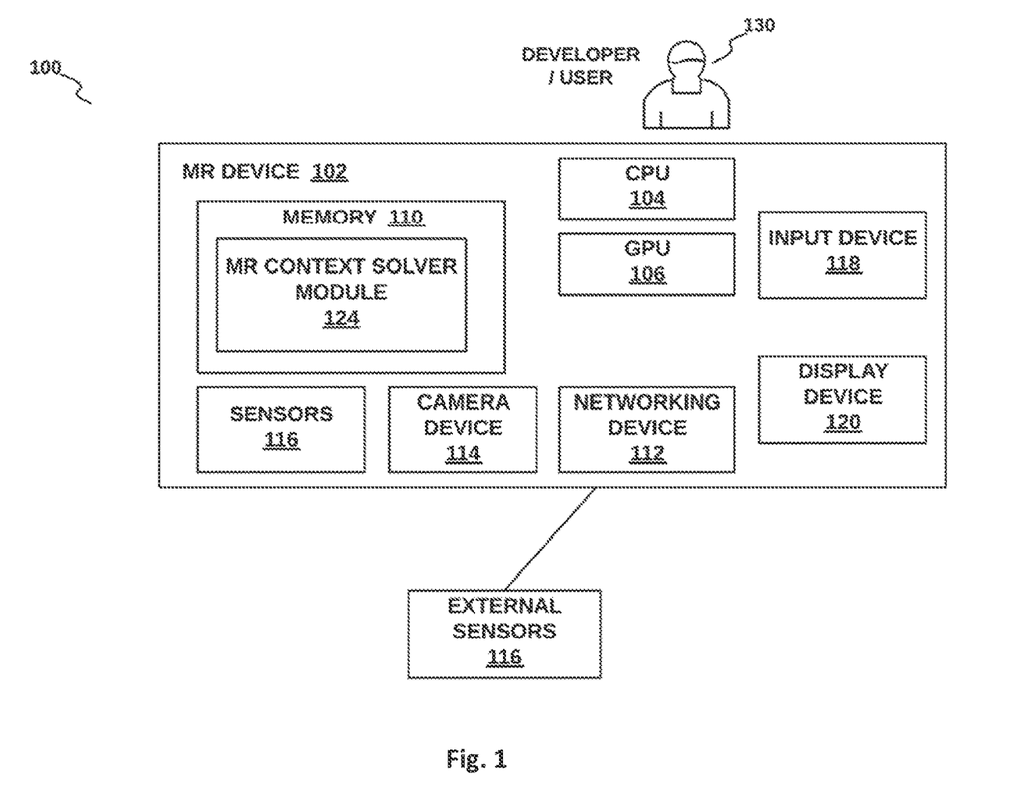
FIG. 1 is a schematic illustrating a MR context solver system, in accordance with one embodiment.

Turning now to the drawings, systems and methods, including non-routine or unconventional components or operations, or combinations of such components or operations, for real-time determination of digital object spawning (e.g., including object selection and placement without user input or coding) in an MR environment based on a context within the environment are illustrated. In accordance with an embodiment, FIG. 1 is a diagram of an example MR context solver system 100 and associated devices configured to provide MR context solver functionality to a user 130 (e.g., a software developer, an augmented reality creation artist, and more). In an example embodiment, the MR context solver system 100 includes a MR device 102 operated by the user 130. The MR device 102 is a computing device capable of providing a mixed reality experience or a mixed reality environment to the user 130. In some embodiments, the MR device 102 is a head-mounted display (HMD) device worn by the user 130, such as an augmented reality (AR) or virtual reality (VR) visor (e.g., Google Glass®, HTC Vive®, Microsoft HoloLens®, and so forth). In other embodiments, the MR device 102 is a mobile computing device, such as a smartphone or a tablet computer. In other embodiments, the MR device is a desktop or laptop computer.

In accordance with an embodiment, the MR device 102 includes one or more central processing units (CPUs) 104, graphics processing units (GPUs) 106. The processing device 104 is any type of processor, processor assembly comprising multiple processing elements (not shown), having access to a memory 110 to retrieve instructions stored thereon, and execute such instructions. Upon execution of such instructions, the instructions cause the processing device 104 to perform a series of tasks as described herein (e.g., in reference to FIG. 2, and FIG. 3). The MR device 102 can also include one or more networking devices 112 (e.g., wired or wireless network adapters) for communicating over a network including a cellular network, a Wi-Fi network, the Internet, and so forth. The MR device 102 further includes one or more camera devices 114 which may be configured to capture digital video of the real-world near the MR device 102 during operation. The MR device 102 may also include one or more sensors 116, such as a global positioning system (GPS) receiver (e.g., for determining a GPS location of the MR device 102), biometric sensors (e.g., for capturing biometric data of the user 130), motion or position sensors (e.g., for capturing position data of the device 102, the user 130 and other objects), a depth sensor (e.g., LIDAR), and an audio microphone (e.g., for capturing sound data). Some sensors 116 may be external to the MR device 102, and may be configured to wirelessly communicate with the MR device 102 (e.g., such as used in the Microsoft Kinect®, Vive Tracker™, MIT's Lidar sensor, or MIT's wireless emotion detector).

The MR device 102 may also include one or more input devices 118 such as, for example, a keyboard or keypad, mouse, pointing device, touchscreen, a microphone, a camera, a hand-held device or the like (e.g., hand motion tracking device) for inputting information in the form of a data signal readable by the processing device 104. The MR device 102 further includes one or more display devices 120, such as a touchscreen of a tablet or smartphone, or lenses or visor of a VR or AR HMD, which may be configured to display virtual objects to the user 130 in conjunction with a real-world view. In accordance with an embodiment, the MR device 102 may also include a display device 120 that renders graphics (e.g., virtual objects) onto the visor (not shown), and as such, the visor acts as a "screen" or surface on which the output of the display device 120 appears, and through which the wearer 130 experiences virtual content. The display device 120 is driven or controlled by one or more GPUs 106. The GPU 106 processes aspects of graphical output that assists in speeding up rendering of output through the display device 120.

The MR device 102 also includes a memory 110 configured to store a MR context solver module 124. The memory 110 can be any type of memory device, such as random access memory, read only or rewritable memory, internal processor caches, and the like. The MR context solver module 124, executing on the MR device 102 (e.g., an HMD), may be configured to capture data from the camera device 114 or sensors 116 to perform various functions of the MR context solver system 100. The camera device 114 and sensors 116 capture data from the surrounding environment, such as video, audio, depth information, GPS location, and so forth. The MR context solver module 124 may be configured to analyze the captured data directly, and analyze processed captured data (e.g., real-time data regarding detected and identified objects, including object shape data, depth maps, semantic information, and the like).

Figure 2:
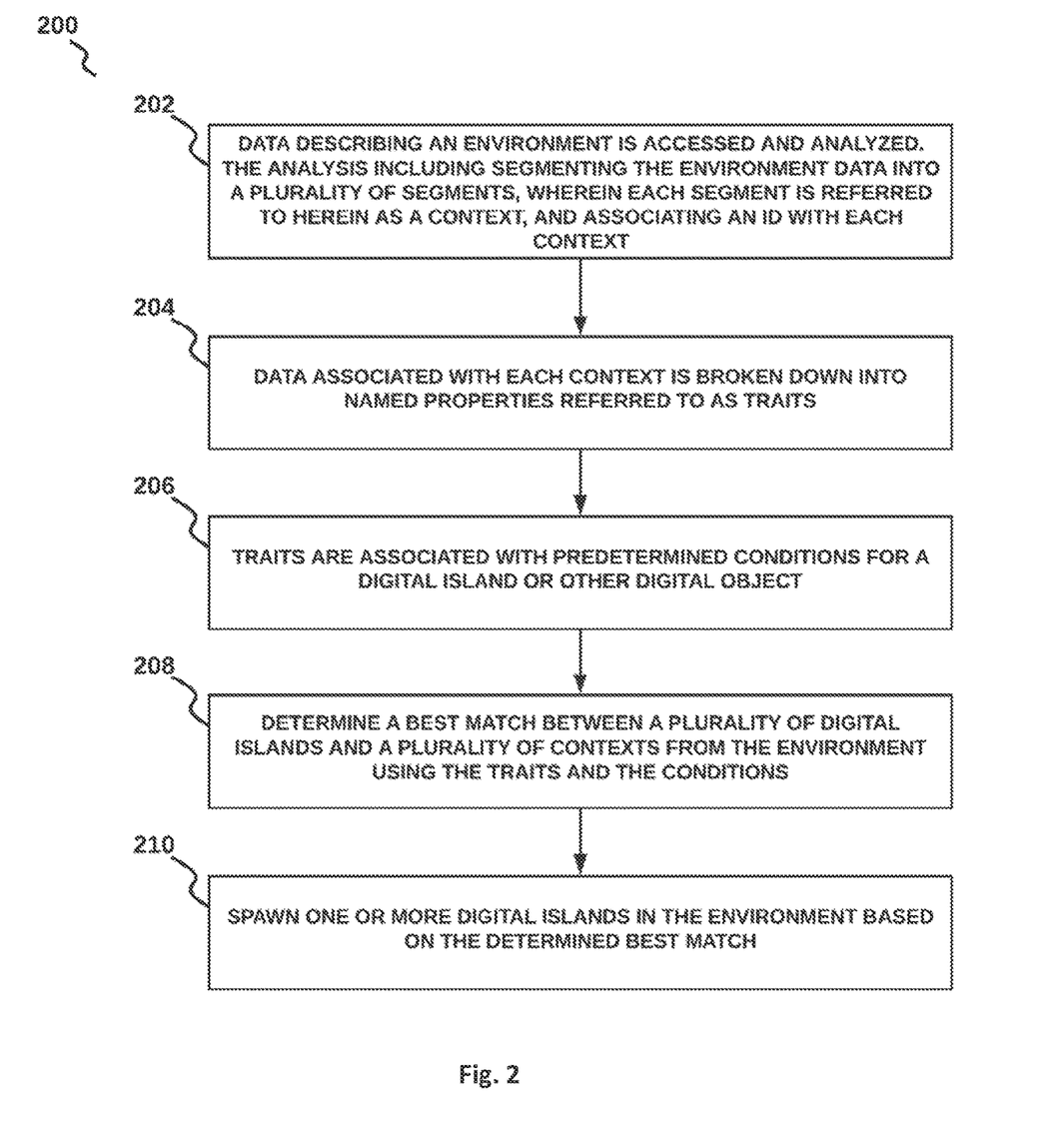
FIG. 2 is a schematic illustrating a flowchart of a method for determining a match of a digital object to a segment of an environment using a MR context solver system, in accordance with one embodiment.

In accordance with an embodiment, and shown in FIG. 2 is a flowchart of a method 200 for spawning one or more digital objects in an environment based on solving for an optimal match of conditions associated with the one or more digital objects with data extracted from the environment (e.g., wherein the extracted data may be related to a segment of the environment). The method 200 may be used in conjunction with the MR context solver system 100 as described with respect to FIG. 1. In various embodiments, some of the method elements shown may be performed concurrently, in a different order than shown, or may be omitted. In accordance with an embodiment, at operation 202 of the method 200, data describing an environment is accessed and analyzed. The environment may be the real-world and the data may be accessed (e.g., received) via sensors 116 on the MR device 102. The environment may also be a virtual environment (e.g., including a virtual reality environment), wherein the data describing the virtual environment may be accessed via the memory 110 (e.g., while using data from the sensors 116 to determine a position and orientation of the MR device 102 within the virtual environment). The data includes data describing properties of the environment and properties of a set of objects within the environment (e.g., objects within a proximity of the sensors 116 and the camera device 114 of the MR device 102). In accordance with an embodiment, as part of operation 202 of the method 200, the MR context solver module 124 may continuously analyze the data from the environment in order to partition the environment into a plurality of segments with each segment referred to herein as a context (e.g., analyzing data from the MR device sensors 116 and camera 114 as the MR device 102 moves through the environment). In accordance with an embodiment, a context may include one or more detected items in the environment such as surfaces and objects, as well as properties of the detected items (e.g., size, orientation, state, type, semantic information, and more). The analysis for segmentation may be performed using image analysis methods (e.g., on data from the camera 114), machine learning methods (e.g., on data from the sensor 116 and the camera 114), signal analysis methods and the like. In accordance with an embodiment, the analysis for segmentation may be performed external to the MR context solver module 124 by an operating system function, a plugging, or the like (e.g., such as ARCore™ SDK and ARkit™ SDK), wherein results of the analysis may be provided to the MR context solver module 124 as part of operation 202.

In accordance with an embodiment, the analysis for segmentation may include determining information regarding the detected surfaces and objects, wherein the information may include a description of dimensions, orientation, relative positions, properties of the surfaces and objects (e.g., textures, materials, type of object, state of object, and more), as well as properties of the environment surrounding the surfaces and objects (e.g., amount of light hitting a surface).

In accordance with an embodiment, as part of operation 202 of the method 200, each determined context of an environment may be assigned an identifier (e.g., a context ID). The context ID may be a unique alpha-numeric identifier used to identify and reference a context (e.g., identifying a segment of the environment and data describing the segment. For example, the context ID may be used to associate additional data such as a trait (e.g., as described below in operation 204, 206 and 208) with a context associated with the context ID. For example, a plurality of traits related to a detected plane context within an environment (e.g., a coffee table top) may be associated (e.g., during operation 204 described below) one single context ID, based on the plurality of traits describing the same surface.

In accordance with an embodiment, part of operation 204 of the method 200, data associated with each context (e.g., device data regarding detected real-world objects such as surfaces, faces, and more, along with properties of the detected objects as determined in operation 202) is broken down into named properties referred to herein as traits. In accordance with an embodiment, each context may have one or more associated traits. In accordance with an embodiment, a trait may include at least a name (e.g., a label) and a value. A trait value may be any kind of data structure representable by a computer (e.g., including numbers (e.g., a 32-bit floating point number), text, vectors, matrices, and more). A trait may represent a unit of data associated with a context (e.g., a trait may describe a property of the context). As an example, a '2D bounding box' trait may include a vector that describes a size of a 2-dimensional bounding box of a context that represents a detected plane in the environment. As another example, a 'Pose' trait may include a position (e.g., as a 3-element vector) and a rotation (e.g., as a quaternion) of the context. In accordance with an embodiment, a trait may include a semantic tag, used to add semantic meaning to a context. For example, a semantic tag trait could be 'floor' or 'wall' to signify that a context determined in operation 202 is a floor or wall, respectively.

In accordance with an embodiment, as described below in operation 208, a trait associated with a context may be used during a matching operation to include the context or exclude the context from a matching. For example, during a matching operation (as described in operation 208), it may be possible to exclude a context with a selected semantic tag (e.g., exclude the context from results of the matching), such as excluding any context which is not a floor.

In accordance with an embodiment, at operation 206, one or more predetermined conditions for a digital island or other digital object are associated with one or more of the traits (e.g., a criteria within a condition is associated with one or more traits such that values of the one or more traits should satisfy the criteria). The predetermined conditions include constraints that may be given to, or associated with (e.g., by a human, an artificial intelligence agent, a set of rules, and the like) a 'digital island' or other digital object prior to operation 206 (e.g., during a creation of the digital island or the other digital object). In accordance with an embodiment, a predetermined condition (e.g., or just 'a condition') sets limits on one or more trait values (e.g., each condition is a constraint on one or more traits). In accordance with an embodiment, a condition may be evaluated based on a trait value, with the evaluation providing a score (e.g., a rating) of the trait value for the condition. The score may be a simple 'pass' or 'fail' signifying that the trait value either satisfies or does not satisfy the condition, respectively. In accordance with an embodiment, there may be a score representing a global score (e.g., an average, a summation, or the like) for all conditions associated with a digital island, wherein a pass represents all conditions for a digital island being satisfied. The score may also be a numeric value representing a degree of passing or failing of the trait value to satisfy the condition. In accordance with an embodiment, for each trait value, the MR context solver module 124 performs a calculation for a condition that returns a score (e.g., a number from 0 to 1) describing how well the trait value meets the constraint associated with the condition. For example, a score value of 0 may represent a failure to satisfy the constraint and a score value of 1 may represent a perfect match of the trait value with the constraint. As an example, a condition may include constraints on a size of a plane, wherein the constraints may reference a '2D bounding box' trait (described above) to determine whether a surface context (which is also associated with the '2D bounding box' trait during operation 204) is of a correct size for digital content to be spawned on. Based on the surface context being within an acceptable size range determined by the condition constraints, the condition passes.

It is possible to receive many different forms of data describing an environment (e.g., during operation 202). For example, the form of data may depend on an analysis being performed external to the MR context solver module 124 by an operating system function, a plugging, or the like (e.g., such as ARCore™ SDK and ARkit™ SDK), wherein each may have a different form for presenting the data. In order for the method 200 to be compatible with external systems, the method 200 operates using data within traits as input to constraints. For example, instead of applying a constraint directly to a data representation of the environment received from an external system (which may be different depending on the external system), the data received from the external system is associated with traits in operation 204 and constraints are applied on a per-trait basis in operation 206.

In accordance with an embodiment, as part of operation 206, one or more constraints (e.g., constraints involving traits) may be associated with a plurality of digital islands or digital objects (e.g., pairs of digital islands) within a group of digital islands. The constraints associated with a plurality of digital islands is referred to herein as a relation. A relation associated with a plurality of digital islands may function in a similar way to a condition associated with a single digital island (or digital object). In accordance with an embodiment, as part of operation 206, the MR context solver module 124 may determine a score for possible pairings of trait values for each relation (e.g., a score for each context). In accordance with an embodiment, as part of determining the score, the MR context solver module 124 may determine a value for the score (e.g., a number from 0 to 1), wherein the value represents a measure describing a quality of fit for the pair of values with respect to the constraint. In accordance with an embodiment, and as shown in operation 208 below, each relation for a group of digital islands must be met in order for spawning to occur.

In accordance with an embodiment, a relation may include one or more conditions (e.g., involving traits) to be satisfied between a plurality of Digital Islands and/or contexts. A relation can include a requirement for one or more conditions to be common between two or more contexts; for example, a relation may include a requirement for two Digital. Islands within an environment to be of a spherical shape. In accordance with an embodiment, a relation can also include a condition which places one or more criteria on a relative distance, orientation, and size between two or more contexts (or two or more digital islands); for example, a relation may include a requirement for two digital islands within an environment to be at a same vertical height, and have a distance between them of less than 5 times the sum of their diameters. In accordance with an embodiment, a relation may include a description of a method to evaluate traits for both contexts against each other, wherein the evaluation determines whether the traits have a correct relationship. In accordance with an embodiment, a relation may include distance as a condition. For example, a distance relation may use the 'pose' trait (described earlier) for a plurality of contexts associated with the relation, to determine a distance between the contexts. The distance relation may be satisfied based on the contexts being within a distance described by the relation. In accordance with an embodiment, a relation may include one or more elevation conditions which define an elevation (e.g., distance above a surface) relationship between two or more contexts. In accordance with an embodiment, a relation may include one or more orientation conditions which may define a relative orientation relationship between two or more contexts (e.g., an orientation of contexts facing each other with respect to internal coordinate systems). As another example of a relation, consider two plane shaped Digital Islands with a relation condition that includes the following: two co-planar surfaces between 3 to 5 meters apart'.

In accordance with an embodiment, at operation 208 of the method 200, the MR context solver module 124 determines an optimal match between a plurality of digital islands and a plurality of contexts from the environment (the contexts determined during operation 202). In accordance with an embodiment, operation 208 may be performed each time an evaluation of the environment is required in order to place a digital island of the plurality of digital islands onto a context of the plurality of contexts (e.g., an evaluation may be performed based on a signal received from a user, or based on a predetermined heuristic or set of rules). In accordance with an embodiment as part of operation 208, the MR context solver module 124 may perform the following operations to determine the optimal match: evaluating one or more conditions of the plurality of digital islands (e.g., evaluating all conditions of the plurality of digital islands) against values of traits determined from each of the plurality of contexts (e.g., as determined in operation 204) (the evaluating may include generating a score (e.g., a number from 0 to 1) representing a measure of quality of fit of a determined value of a trait and a condition of the one or more conditions); determining an intersection of one or more contexts (e.g., real world segments), wherein each of the one or more contexts match every condition for a digital island of the plurality of digital islands; removing a context that is in use (e.g., occupied by an additional digital island); combining condition scores into a single score for each digital island of the plurality of digital islands with respect to for each context of the one or more contexts; and evaluating relations against possible pairings produced by the matches for each context. In accordance with an embodiment, as part of operation 208, the MR context solver module 124 generates a weighted multi-layer network graph using the condition and relation matching results, wherein each layer in the graph is associated with a relation, each vertex in the graph is a context of the plurality of contexts which is a possible match for one digital island of the plurality of digital islands for each relation, and each edge connecting two contexts within a layer in the graph, is a valid match of the relation for the layer between the two contexts. In accordance with an embodiment, a vertex which represents a context in a graph is labeled with a context ID associated with the context (e.g., determined in operation 202). Furthermore, as part of operation 208 of the method 200, in order to determine a best-matching context for each digital island of the plurality of digital islands, the MR context solver module 124 performs a search for all subgraph isomorphisms of the graph that represents constraints for the plurality of digital islands. Furthermore, each found isomorphism graph is given a score based on a score of each of its vertices and edges. An isomorphism graph of the found isomorphism graphs with an optimum score (e.g., a largest score) is chosen as an optimum match. In accordance with an embodiment, based on the optimum match being unavailable for any reason, a next-best score (and associated subgraph) is selected.

In accordance with an embodiment, matching data within the optimum isomorphic graph (e.g., the isomorphism graph with the optimum score) may be returned to the plurality of digital islands. The matching data may include a mapping of a set of digital islands from the plurality of digital islands for each context found in operation 202 (e.g., including a null set).

In accordance with an embodiment, based on a context match being selected for a digital island (or group of digital islands), the selected context may be marked as 'used' to prevent other content (e.g., other digital islands) from matching against the same data.

In accordance with an embodiment, at operation 210 of the method 200, the MR context solver module 124 may spawn a digital island on a context in the environment based on the determined best match with the context.

In accordance with an embodiment, a single real-world context may be suitable for more than one digital island, and operation 208 may determine that one or more digital islands are matched with the context based on predetermined rules of sharing. The predetermined rules may be associated with a digital island prior to operation 202 of the method 200 (e.g., during a creation of the digital island). The rules for sharing may determine that two digital islands cannot occupy a same context, or that two or more selected digital islands may occupy a same context in the environment.

Figure 3:
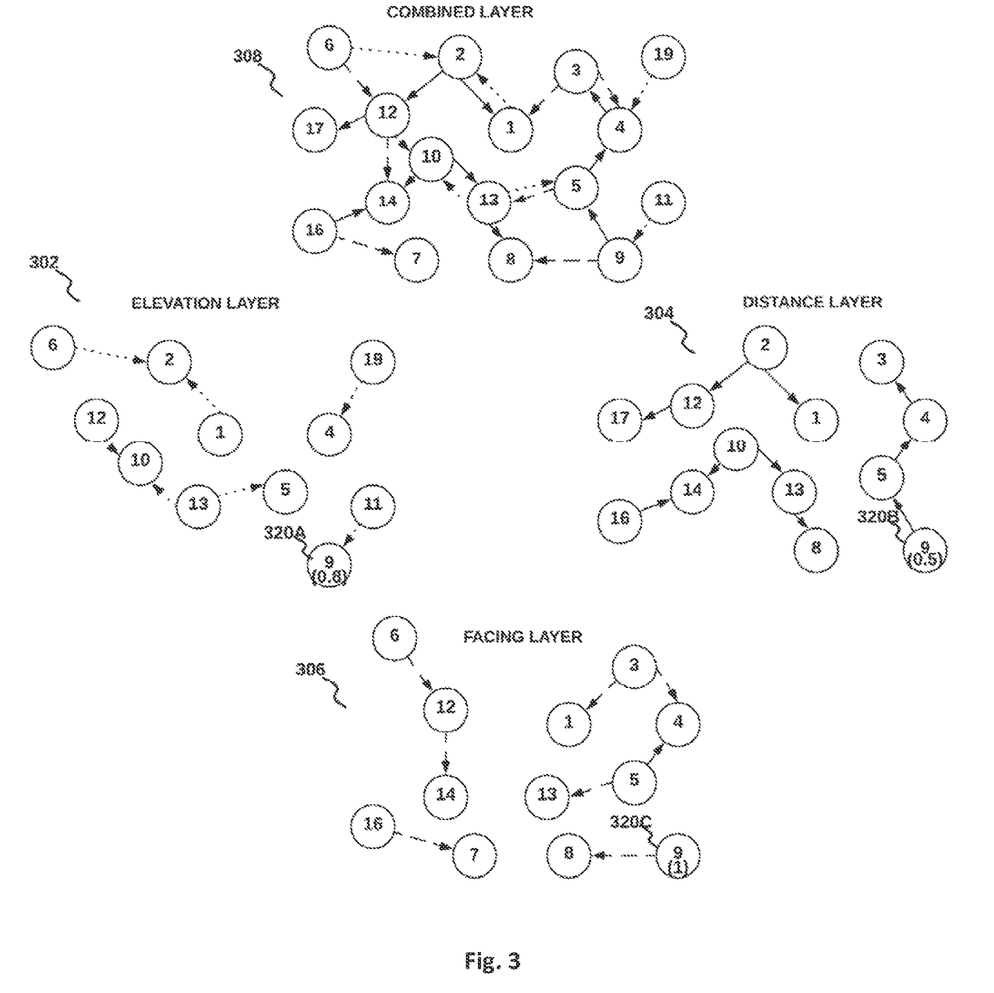
FIG. 3 is a schematic illustrating a plurality of graphs in an MR context solver system, in accordance with one embodiment.

In accordance with an embodiment and shown in FIG. 3 is an example of a graph generated in operation 208. In the example of FIG. 3, there are three relations (an Elevation relation, a Distance relation, and a Facing relation) with one graph layer for each relation. In accordance with operation 208, there is a first graph layer 302 representing contexts connected with an Elevation relation (relations between contexts are shown with a short dashed line), there is a second graph layer 304 representing contexts connected with a Distance relation (relations between contexts are shown with a solid line), and there is a third graph layer 306 representing contexts connected with a Facing relation (relations between contexts shown with a long dashed line). In accordance with an embodiment, the first graph layer 302, second graph layer 304 and third graph layer 306 may be combined into a single graph 308 showing all relations (the single graph representing a weighted multi-layer network graph from operation 208). In accordance with an embodiment, and described in operation 208 and shown in FIG. 3, a vertex may be included in one or more layers and may be categorically coupled across layers with a context ID (e.g., an ID for a context the vertex represents as determined in operation 202) and is linked to itself in all other layers the vertex appears in. For example, a vertex with context ID #9 appears in all three layers (e.g., 320A, 320B, and 320C) but represents a single context within an environment with context ID #9. In accordance with an embodiment, as described in operation 208 and shown in FIG. 3, each vertex with a context ID appearing in different layers may have an associated weight representing a score (as determined in operation 208) for each layer related to the relation of the layer. For example, vertex context ID #9 320A in the Elevation layer 302 has a weight value of 0.8, vertex context ID #9 320B in the Distance layer 304 has a weight value of 0.5, and vertex context ID #9 320C in the Facing layer 306 has a weight value of 1.0. In accordance with an embodiment, though not shown in FIG. 3, all vertices may have an associated weight corresponding to a score for each layer. Similarly, though not shown in FIG. 3, each connecting edge may have an associated weight corresponding to a score as determined in operation 208.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (Saas). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
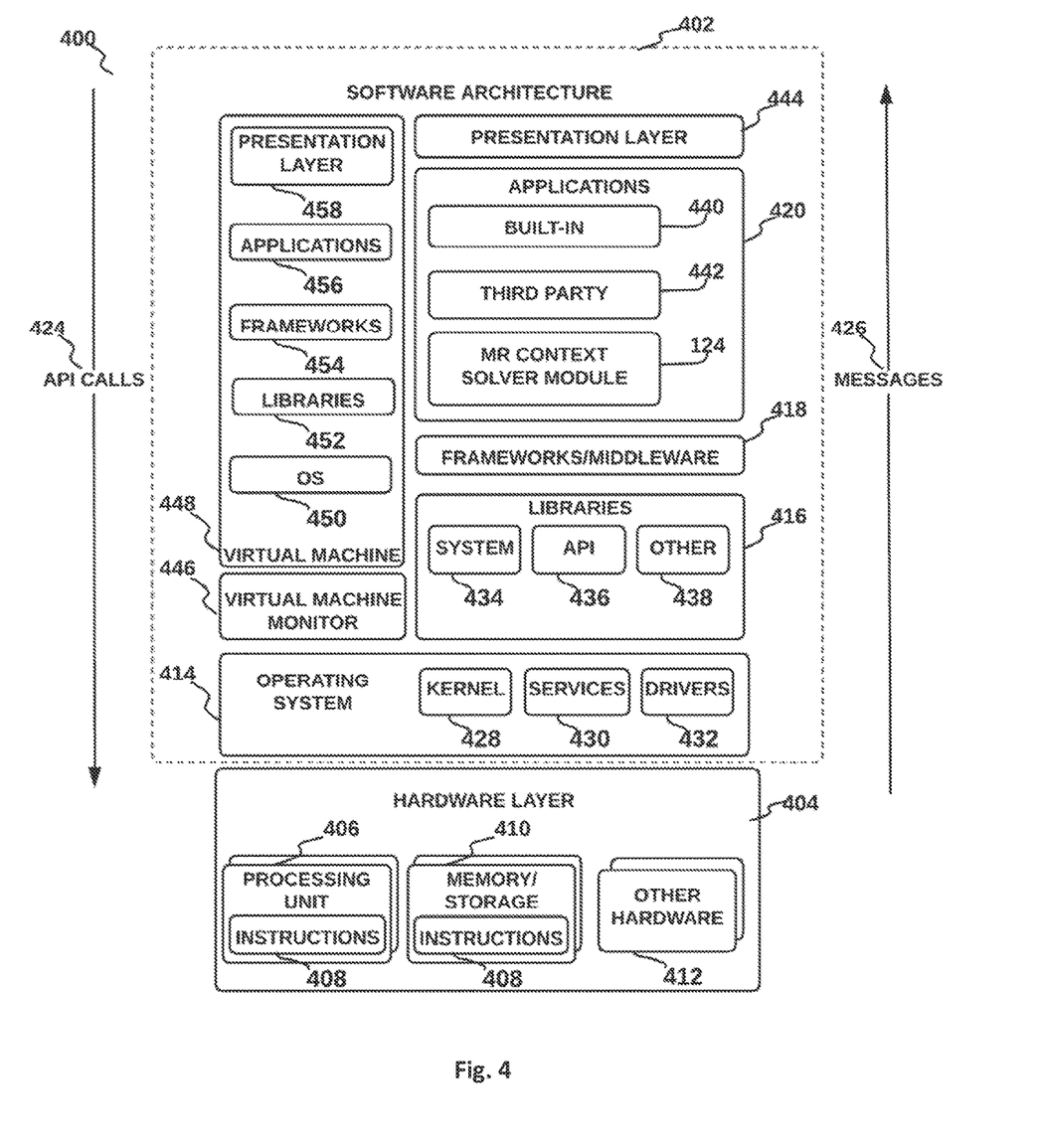
FIG. 4 is a block diagram illustrating an example software architecture, which may be used in conjunction with various hardware architectures described herein.

FIG. 4 is a block diagram 700 illustrating an example software architecture 702, which may be used in conjunction with various hardware architectures herein described to provide a gaming engine 701 and/or components of the MR Context Solver system 100. FIG. 4 is a non-limiting example of a software architecture and it will be appreciated that many other architectures may be implemented to facilitate the functionality described herein. The software architecture 702 may execute on hardware such as a machine 800 of FIG. 5 that includes, among other things, processors 810, memory 830, and input/output (I/O) components 850. A representative hardware layer 704 is illustrated and can represent, for example, the machine 800 of FIG. 5. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which, also includes the executable instructions 708. The hardware layer 704 may also comprise other hardware 712.

In the example architecture of FIG. 4, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications third-party applications 742. Examples 740 and/or of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 4, this is illustrated by a virtual machine 748. The virtual machine 748 creates a software environment where applications/modules can execute as if they were executing on a hardware machine (such as the machine 800 of FIG. 5, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 5:
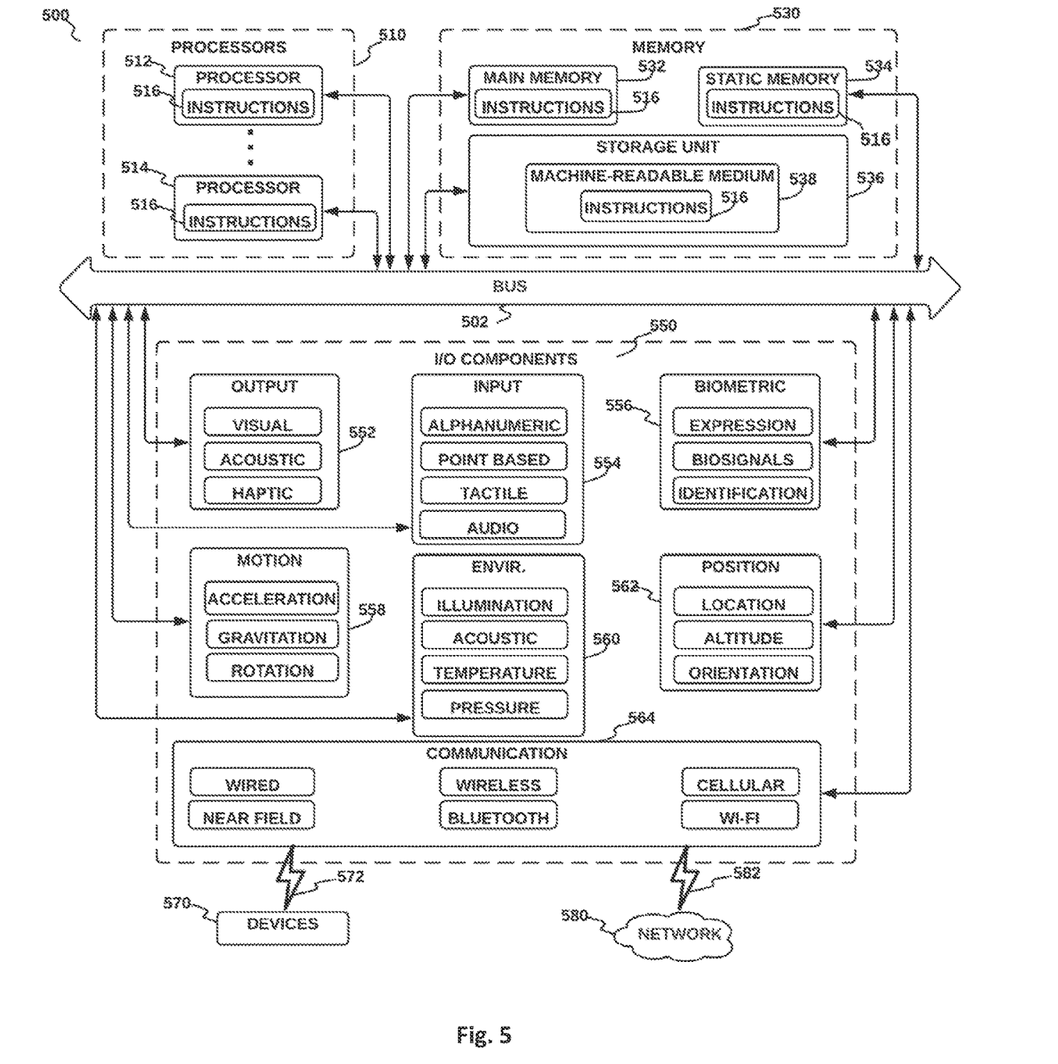
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the MR device 102. Specifically, FIG. 5 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 5 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800.

Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 5. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (OR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance.

Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A non-transitory computer-readable storage medium storing a set of instructions that, when executed by one or more computer processors, cause the one or more computer processors to perform operations, the operations comprising:
   accessing data describing a three-dimensional environment;
   partitioning data into a plurality of contexts based on properties identified in the data, the properties corresponding to surfaces or objects in the three-dimensional environment;
   generating a network graph, wherein each layer of the network graph represents a relation of one or more relations, each vertex represents a context of the plurality of contexts, and each edge on a layer represents a valid match of the relation for the layer;
   performing a search for one or more subgraph isomorphisms of the network graph; and
   matching a digital island with a context of a plurality of contexts based on a selection from the one or more subgraph isomorphisms.

2. The non-transitory computer-readable storage medium of claim 1, further comprising:
   identifying one or more values of one or more traits corresponding to an additional context of the plurality of contexts;
   matching an additional digital island to the additional context, the matching including analyzing one or more conditions associated with the additional digital island with respect to the one or more values of the one or more traits corresponding to the additional context and a relation associated with one or more pairings of the one or more values of the one or more traits corresponding to the context and one or more values of the one or more traits corresponding to the additional context; and
   based on the matching of the additional digital island to the context, spawning the additional digital island in the three-dimensional environment for the additional context.

3. The non-transitory computer-readable storage medium of claim 2, wherein the relation specifies a relative distance, orientation, or size between the digital island and the additional digital island.

4. The non-transitory computer-readable storage medium of claim 2, the operations further comprising selecting the digital island as an optimal digital island for the context based on a measure of a quality of fit of the digital island being higher than a measure of a quality of fit of the additional digital island for the context.

5. The non-transitory computer-readable storage medium of claim 4, wherein the measure of the quality of the fit of the digital island for a context includes a score representing combined scores of each of the one or more values of the one or more traits with respect to each of the one or more conditions.

6. The non-transitory computer-readable storage medium of claim 2, the operations further comprising spawning an additional digital island in the three-dimensional environment for the context based on a rule specifying that two or more digital islands may occupy the context.

7. The non-transitory computer-readable storage medium of claim 1, the operations further comprising marking the context as used to prevent any additional digital islands from being matched to the context again.

8. The non-transitory computer-readable storage medium of claim 1, the operations further comprising:
   determining a score for one or more relations between the digital island and the plurality of contexts; and
   based on a scoring of each of the one or more subgraph isomorphisms based on scores of each vertex and edge, selecting the one or more subgraph isomorphisms.

9. A method comprising:
   accessing data describing a three-dimensional environment;
   partitioning data into a plurality of contexts based on properties identified in the data, the properties corresponding to surfaces or objects in the three-dimensional environment;
   generating a network graph, wherein each layer of the network graph represents a relation of one or more relations, each vertex represents a context of the plurality of contexts, and each edge on a layer represents a valid match of the relation for the layer;
   performing a search for one or more subgraph isomorphisms of the network graph; and matching a digital island with a context of a plurality of contexts based on a selection from the one or more subgraph isomorphisms.

10. The method of claim 9, further comprising:
identifying one or more values of one or more traits corresponding to an additional context of the plurality of contexts;
matching an additional digital island to the additional context, the matching including analyzing one or more conditions associated with the additional digital island with respect to the one or more values of the one or more traits corresponding to the additional context and a relation associated with one or more pairings of the one or more values of the one or more traits corresponding to the context and one or more values of the one or more traits corresponding to the additional context; and
based on the matching of the additional digital island to the context, spawning the additional digital island in the three-dimensional environment for the additional context.

11. The method of claim 10, wherein the relation specifies a relative distance, orientation, or size between the digital island and the additional digital island.

12. The method of claim 10, further comprising selecting the digital island as an optimal digital island for the context based on a measure of a quality of fit of the digital island being higher than a measure of a quality of fit of the additional digital island for the context.

13. The method of claim 12, wherein the measure of the quality of the fit of the digital island for a context includes a score representing combined scores of each of the one or more values of the one or more traits with respect to each of the one or more conditions.

14. The method of claim 10, further comprising spawning an additional digital island in the three-dimensional environment for the context based on a rule specifying that two or more digital islands may occupy the context.

15. The method of claim 9, further comprising marking the context as used to prevent any additional digital islands from being matched to the context again.

16. The method of claim 9, further comprising:
determining a score for one or more relations between the digital island and the plurality of contexts; and
based on a scoring of each of the one or more subgraph isomorphisms based on scores of each vertex and edge, selecting the one or more subgraph isomorphisms.

17. A system comprising:
one or more computer processors:
one or more computer memories;
a set of instructions stored in the one or more computer memories, the set of instructions configuring the one or more computer processors to perform operations, the operations comprising:
accessing data describing a three-dimensional environment;
partitioning data into a plurality of contexts based on properties identified in the data, the properties corresponding to surfaces or objects in the three-dimensional environment;
generating a network graph, wherein each layer of the network graph represents a relation of one or more relations, each vertex represents a context of the plurality of contexts, and each edge on a layer represents a valid match of the relation for the layer;
performing a search for one or more subgraph isomorphisms of the network graph; and
matching a digital island with a context of a plurality of contexts based on a selection from the one or more subgraph isomorphisms.

18. The system of claim 17, the operations further comprising:
identifying one or more values of one or more traits corresponding to an additional context of the plurality of contexts;
matching an additional digital island to the additional context, the matching including analyzing one or more conditions associated with the additional digital island with respect to the one or more values of the one or more traits corresponding to the additional context and a relation associated with one or more pairings of the one or more values of the one or more traits corresponding to the context and one or more values of the one or more traits corresponding to the additional context; and
based on the matching of the additional digital island to the context, spawning the additional digital island in the three-dimensional environment for the additional context.

19. The system of claim 18, wherein the relation specifies a relative distance, orientation, or size between the digital island and the additional digital island.

20. The system of claim 18, the operations further comprising selecting the digital island as an optimal digital island for the context based on a measure of a quality of fit of the digital island being higher than a measure of a quality of fit of the additional digital island for the context.

* * * * *